July 17, 1956     I. C. PERCIVAL ET AL     2,755,123
SEAL
Filed Sept. 2, 1952
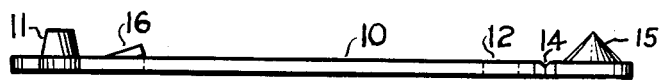
Fig. 1
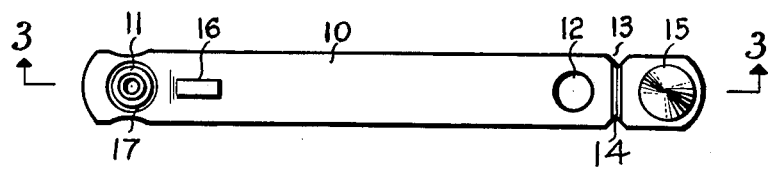
Fig. 2
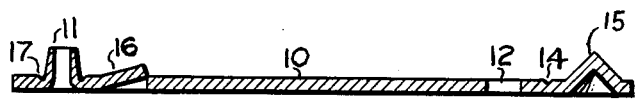
Fig. 3
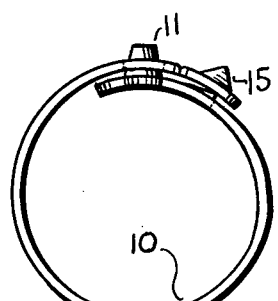
Fig. 4
Fig. 8
Fig. 5
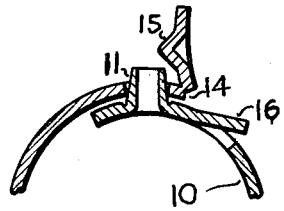
Fig 6
Fig. 9
Fig. 7
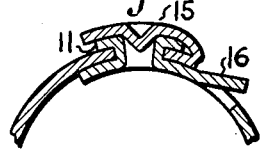
INVENTORS
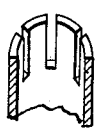

United States Patent Office 2,755,123
Patented July 17, 1956

2,755,123

SEAL

Isabel C. Percival and Joseph E. Tierney,
Ottawa, Ontario, Canada

Application September 2, 1952, Serial No. 307,552

8 Claims. (Cl. 292—314)

This invention relates to seals that are locked by hand, without the use of tools, such as pliers; the locking means being an integral part of the seal which may be broken off and discarded after it has been used.

An object of this invention is to provide seals that may be shipped to the ultimate consumer and used by him without having to resort to the use of tools of any kind to apply it.

Another object of the invention is to prevent the loss of tools, as farmers are apt to drop pliers etc. in the grass where they are difficult to find and may be easily overlooked or forgotten.

In the accompanying drawings—

Figure 1 is a side elevation of the seal in open position.

Figure 2 is a plan view thereof.

Figure 3 is a central longitudinal section on the plane of line 3—3 of Figure 2.

Figure 4 shows the seal assembled preparatory to locking.

Figure 5 is a fragmentary section showing the locking boss partially bent over.

Figure 6 shows the locking boss pressed down and the hollow stud bent over into clamping position.

Figure 7 is a fragmentary section of the seal with the locking completed.

Figures 8 and 9 are enlarged fragmentary sections showing the end of the hollow stud, crimped and slotted respectively.

The device consists of a band 10 of sheet material of any desired width and appropriate length. Near one end thereof a hollow stud 11 is upstruck. Adjacent the other end of the band there is an orifice 12 which, when the band is brought around to assembled position engages over the stud 11. Beyond the orifice the band may be reduced and weakened as shown at 13 and 14.

At the end of the band adjacent the orifice 12 a tapered boss 15 is struck on the same side of the band as the stud 11.

As an extra locking feature a tongue 16 may be struck from the band adjacent the stud, as shown in the drawings. This tongue may be bent up and over the end 14 of the assembled seal, after the boss portion has been broken off, as shown in Figure 7.

The material of the stud 11 is preferably tapered, as shown in Figure 3, so that if the turned over material is opened after use it will break off if again forced down. If desired the stud 11 may be slotted or crimped, so that the arms formed by the slots or from the crimps may be more easily spread. A weakening groove 17 may also be placed around the stud 11, as shown in Figures 2 and 3, if desired.

The seal is assembled by placing it around the object to which it is to be attached, engaging the orifice 12 over the stud 11, bending the boss 15 over at the weakened line 14 and pressing it into the stud 11, thereby spreading the upper portion of the stud down into firm locking position around the orifice 12. The tapered boss 15 is then broken off at the weakened portion 14, if it has not already done so, and discarded. If the tongue 16 is provided this is then bent up and back over the edge 14.

While the stud, orifice and boss have been shown as circular in plan, they may be of any other shape, such as square, triangular, etc.

It is not essential that the band be reduced in width as at 13. It may be of uniform width and the weakening groove 14 extended right across the full width of the band.

Indicia for identification purposes may be applied to the band by embossing, stamping, printing or other means.

Changes within the scope of the invention shown will be apparent to those skilled in the art; it is therefore intended that the disclosure shall not be read in a restricted light except as provided by the following claims.

The embodiments of the invention in which an exclusive property or privilege is claimed are defined as follows:

1. A seal composed of a band of sheet material, a hollow stud upstruck therefrom near one end, the band being provided with an orifice adjacent the other end, a weakened portion beyond said orifice and a boss formed on the end of the band beyond the weakened portion.

2. The device as claimed in claim 1 wherein the hollow stud is slotted.

3. The device as claimed in claim 1 wherein the stud, orifice and boss are circular in plan.

4. The device as claimed in claim 1 wherein the material of the hollow stud is tapered.

5. The device as claimed in claim 1 wherein the stud is crimped around its upper edge when the seal is in its secured position.

6. A seal composed of a band of sheet material, a hollow stud upstruck therefrom near one end, the band being provided with an orifice adjacent the other end, a weakened portion beyond the orifice and means integral with the band beyond the weakened portion to spread the stud when the seal is assembled with the stud through the orifice, said means being discardable after use.

7. A seal composed of a band of sheet material, a hollow tapered stud upstruck therefrom near one end, a groove around the base of said stud, the band being provided with an orifice adjacent the other end, a reduced and weakened portion beyond said orifice, a boss formed on the band beyond the weakened portion and a tongue adjacent the stud to clamp over the end of the band formed when the boss is broken off at the weakened portion with the seal in assembled relation.

8. A seal composed of a band of sheet material, a hollow stud upstruck from the band near one end, a groove around the base of said stud, the band being provided with an orifice adjacent the other end, a weakened portion beyond the orifice and means integral with the band to spread the stud when the seal is assembled with the stud through the orifice, said means being discardable after being broken off at the weakened portion.

References Cited in the file of this patent

UNITED STATES PATENTS

| | | |
|---|---|---|
| 1,679,467 | Dinsmoor | Aug. 7, 1928 |
| 1,772,983 | Brooks | Aug. 12, 1930 |
| 2,163,016 | Barker | June 20, 1939 |